United States Patent [19]
Liu

[11] Patent Number: 5,967,280
[45] Date of Patent: Oct. 19, 1999

[54] HAND WHEEL DEVICE HAVING A CLUTCH DEVICE

[76] Inventor: Tong-Po Liu, No. 46-22, Alley 111, Lane 92, Feng Nan Street, Feng Yuan City, Taichung Hsien, Taiwan

[21] Appl. No.: 09/097,514

[22] Filed: Jun. 15, 1998

[51] Int. Cl.[6] .................................................. F16D 11/04
[52] U.S. Cl. .................. 192/69.8; 192/69.83; 192/69.3; 192/89.21
[58] Field of Search .................. 192/69.8, 69.3, 192/69.82, 66.23, 69.83, 89.21, 34

[56] References Cited

U.S. PATENT DOCUMENTS

| | | | |
|---|---|---|---|
| 962,567 | 6/1910 | Hancock | 192/69.8 |
| 1,946,263 | 2/1934 | Bach | 192/89.21 |
| 2,462,363 | 2/1949 | Cook | 192/69.8 |
| 2,803,323 | 8/1957 | Newell | 192/69.8 |
| 2,919,775 | 1/1960 | Wiedmann et al. | 192/69.8 |
| 3,491,602 | 1/1970 | New | 192/69.8 |
| 3,601,236 | 8/1971 | Stephenson | 192/69.8 |
| 3,760,919 | 9/1973 | Gilsinger | 192/89.21 |
| 3,934,688 | 1/1976 | Sides et al. | 192/89.21 |
| 3,986,409 | 10/1976 | Tripp et al. | 192/34 X |
| 5,538,089 | 7/1996 | Sanford | 192/34 X |
| 5,703,277 | 12/1997 | Grabovac | 73/1.12 |

*Primary Examiner*—Charles A. Marmor
*Assistant Examiner*—Ha Ho
*Attorney, Agent, or Firm*—Charles E. Baxley, Esq.

[57] ABSTRACT

A hand wheel device is to be secured to a motor driven bolt for selectively actuating the motor driven bolt. The hand wheel device includes a barrel secured to the bolt, a disc and a plate secured on the barrel and having a number of teeth. A wheel is rotatably and slidably engaged on the barrel and has a number of teeth extended toward the plate for engaging with the teeth of the plate. A spring may bias the teeth of the wheel away from the teeth of the plate. A spacer device may selectively space the teeth of the wheel away from the teeth of the plate such that the wheel may be disengaged from the bolt when it is not required to use the wheel to rotate the bolt.

4 Claims, 4 Drawing Sheets

HAND WHEEL DEVICE HAVING A CLUTCH DEVICE

BACKGROUND OF THE INVENTION

1. Field of the Invention

The present invention relates to a hand wheel device, and more particularly to a hand wheel device having a clutch device for selectively coupling the hand wheel device to a motor driven bolt.

2. Description of the Prior Art

Typical work tables or working machines may comprise a table slidably supported on top of a base, and a motor driven tool, such as bolt, coupled to the table for moving the table, and a hand wheel coupled to the bolt for rotating the bolt and for moving the table. However, the hand wheel may not be disengaged from the bolt such that the hand wheel should always be rotated and driven by the bolt.

The present invention has arisen to mitigate and/or obviate the afore-described disadvantages of the conventional hand wheels.

SUMMARY OF THE INVENTION

The primary objective of the present invention is to provide a hand wheel device which includes a clutch device for selectively coupling the hand wheel device to the motor driven bolt and for disengaging the hand wheel device from the motor driven bolt when the hand wheel device is not required to be used.

In accordance with one aspect of the invention, there is provided a hand wheel device for securing to a motor driven bolt and for selectively actuating the motor driven bolt, the hand wheel device comprising a barrel secured to the bolt, the barrel including a first and and a second end, a disc engaged on the first end of the barrel, a plate including a plurality of teeth and secured to the disc and secured to the first end of the barrel such that the barrel and the bolt and the disc and the plate rotate in concert with each other, a wheel rotatably and slidably engaged on the second end of the barrel, the wheel including a plurality of teeth extended toward the plate for engaging with the teeth of the plate, means for biasing the teeth of the wheel away from the teeth of the plate, and means for selectively spacing the teeth of the wheel away from the teeth of the plate.

The wheel includes a handle secured thereto for actuating the wheel.

The disc includes an annular bulge extended toward the wheel, a spacer pivotally coupled to the disc at a shaft, and means for biasing the spacer to engage between the annular bulge of the disc and the wheel for spacing the teeth of the wheel away from the teeth of the plate, the wheel is allowed to be moved toward the disc for engaging the teeth of the wheel with the teeth of the plate when the spacer is disengaged from the annular bulge of the disc. The shaft is disengaged from the annular bulge of the disc. The spacer includes a first end for engaging between the annular bulge of the disc and the wheel and for spacing the teeth of the wheel away from the teeth of the plate, the spacer includes a second end for depressing the spacer against the spacer biasing means and for disengaging the first end of the spacer from the annular bulge of the disc.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
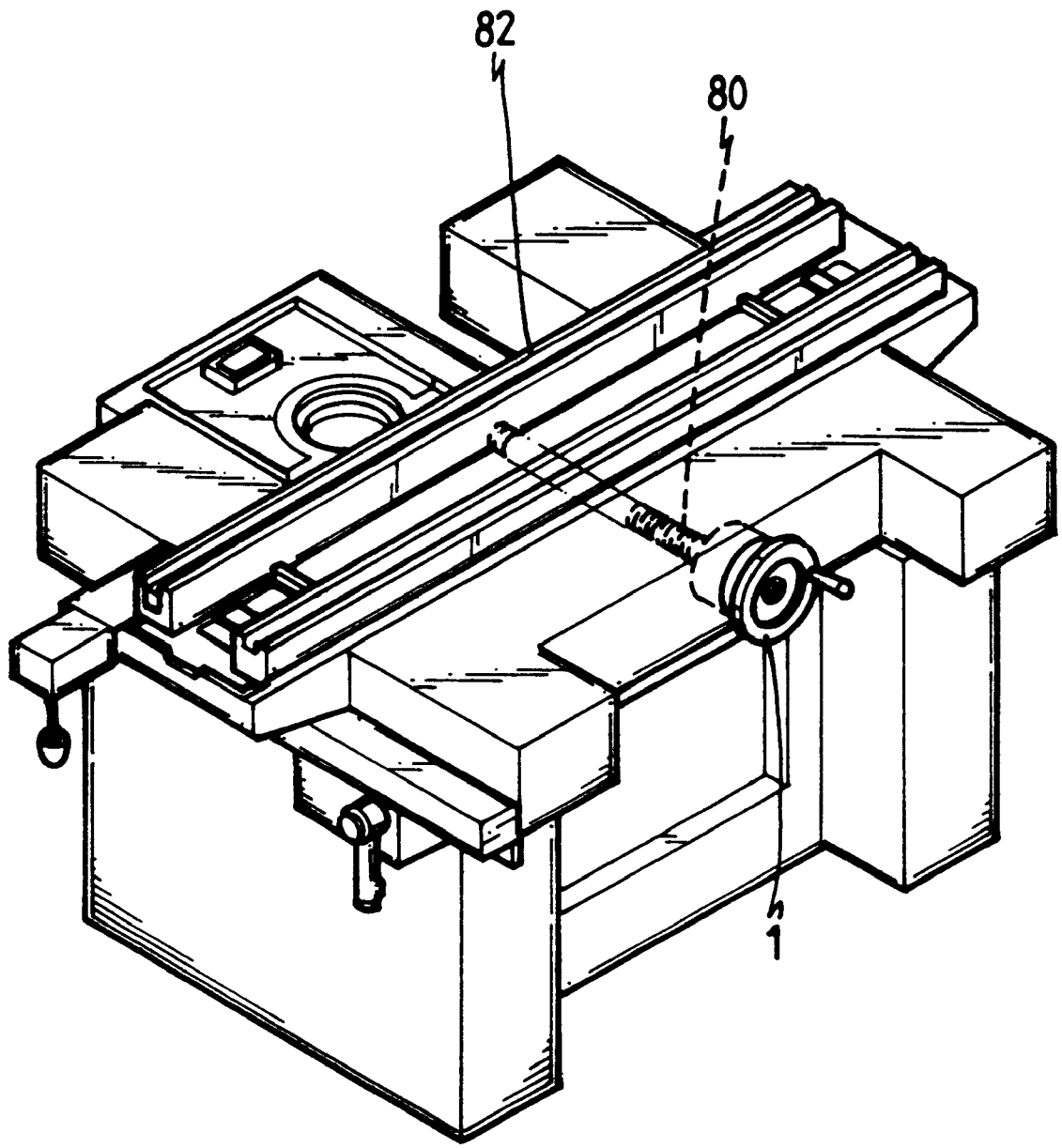
FIG. 1 is a perspective view of a working machine which employs a hand wheel device in accordance with the present invention.

Referring to the drawings, and initially to FIG. 1, a typical working machine may includes a motor driven bolt 80 coupled to a table 82 for moving the table 82 and for allowing the table 82 to be driven by a motor via the motor driven bolt 80. A hand wheel device in accordance with the present invention is provided for coupling to the motor driven bolt 80 and for allowing the hand wheel device to be selectively disengaged from the bolt 80.

Figure 2:
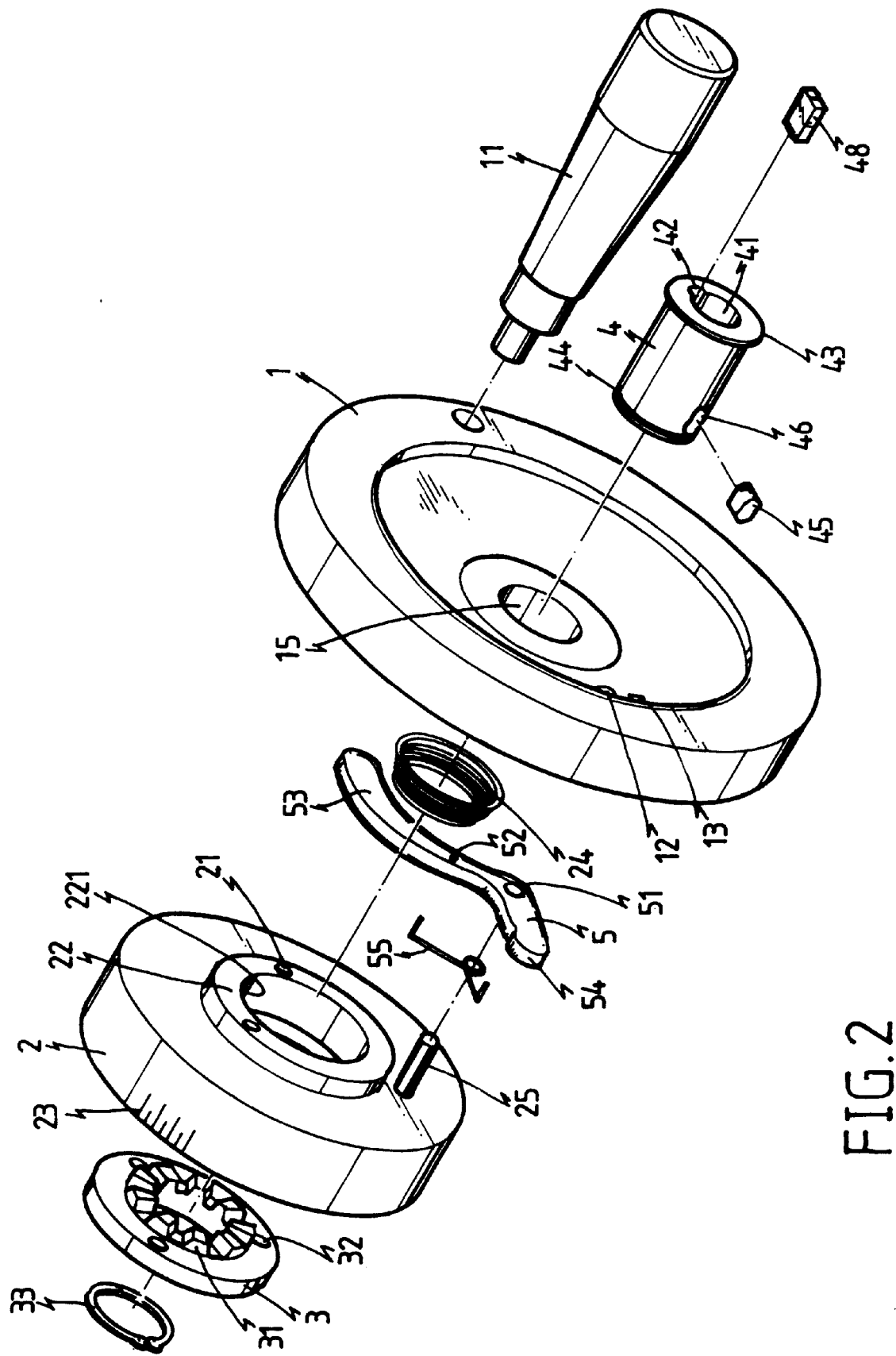
FIG. 2 is an exploded view of the hand wheel device.
Figure 3:
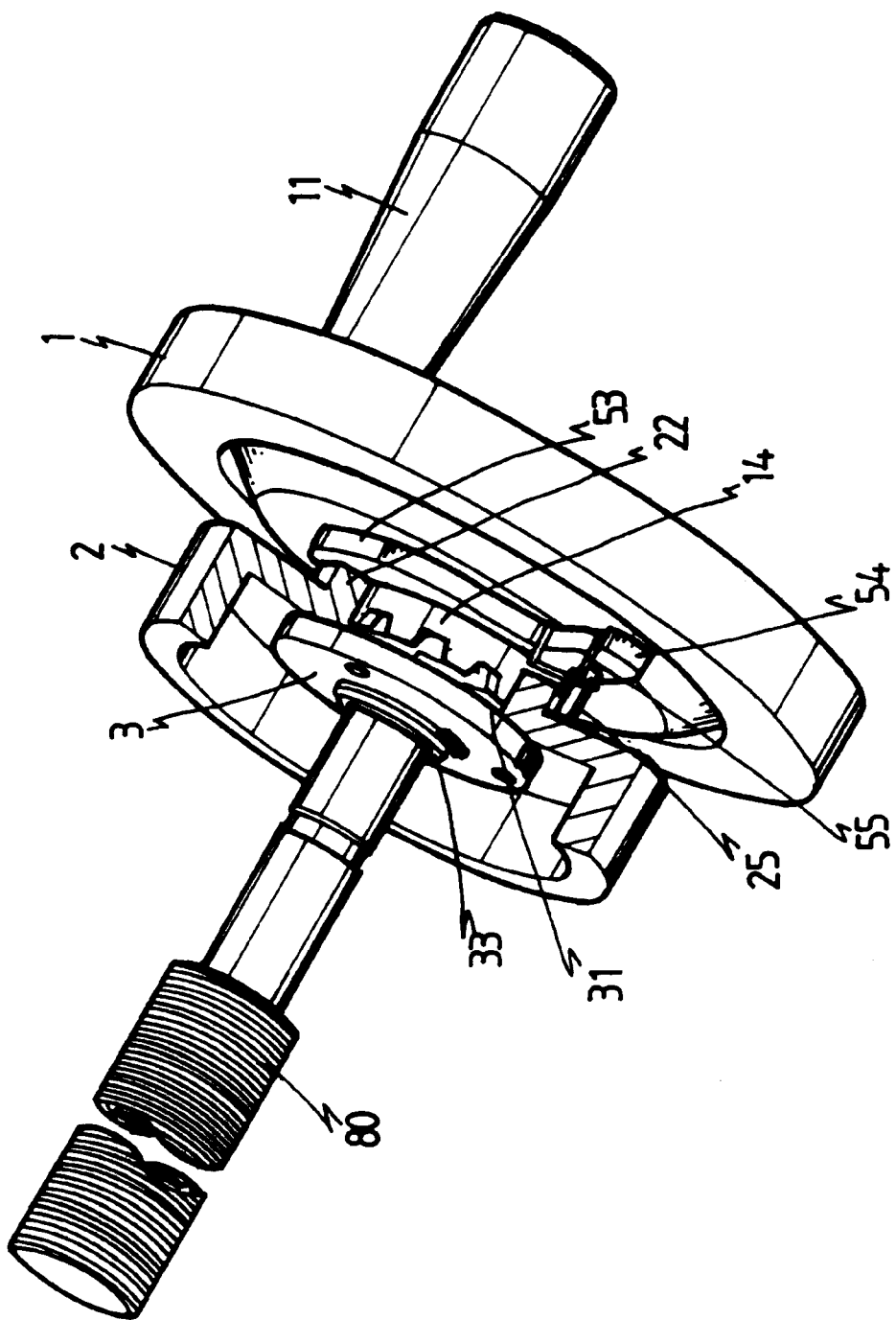
FIG. 3 is a perspective view of the hand wheel device, in which a portion of the hand wheel device is cut off for showing the inner structure of the hand wheel device.
Figure 4:
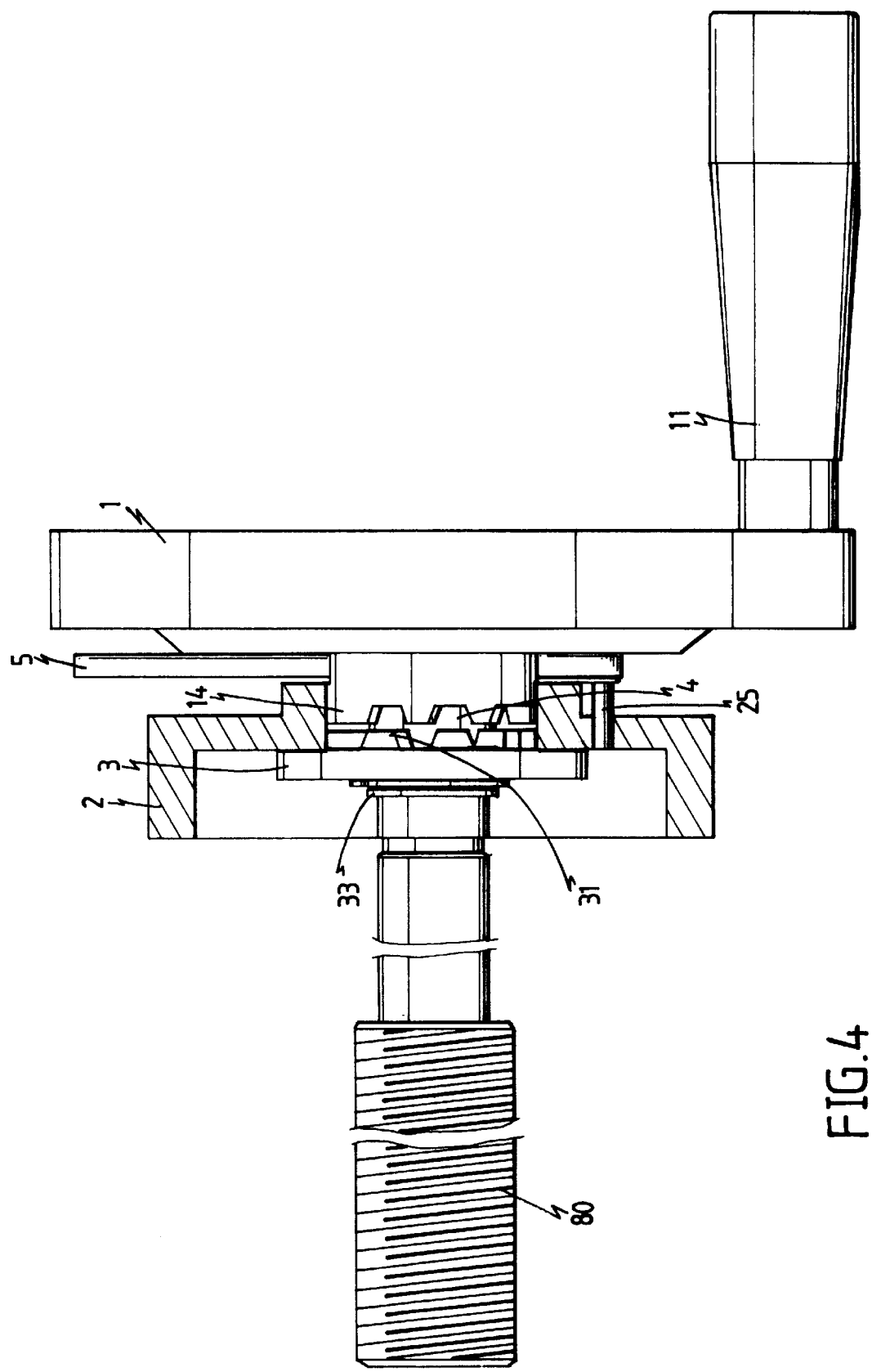
FIG. 4 is a plan view of the hand wheel device.

Referring next to FIGS. 2–4, the hand wheel device comprises a casing or a disc 2 including a graduation, such as an angular graduation 23 provided on the outer peripheral surface of the disc 2. The disc 2 includes an annular bulge 22 extended forward and includes an opening 221 for rotatable receiving the bolt 80. The annular bulge 22 includes a number of screw holes 21 for receiving fasteners. A plate 3 includes a number of holes 32 for receiving the fasteners and for securing to the disc 2 and includes a number of teeth 31 extended foward therefrom. The plate 3 is rotatably engaged on the bolt 80. The disc 2 includes a shaft 25 extended forward and separated from the annular bulge 22. A wheel 1 includes a bore 15 and includes two holes 12, 13. A handle 11 is secured to the peripheral portion of the wheel 1 for rotating and for moving the wheel 1. The wheel 1 includes a number of teeth 14 (FIGS. 3, 4) extended rearward for engaging with the teeth 31 of the plate 3. A spring 24 is engaged on the barrel 4 and engaged between the wheel 1 and the plate 3 and/or the disc 2 for disengaging the teeth 14 of the wheel 1 from that of the plate 3.

A barrel 4 is rotatably engaged in the bore 15 of the wheel 1 and includes an orifice 41 for receiving the bolt 80 and includes an annular flange 43 extended radially outward from the front portion for engaging with the wheel 1 and for preventing the wheel 1 from being disengaged from the barrel 4. The barrel 4 includes an annular groove 44 formed in the rear end for engaging with a retaining ring 33 which is engaged with the disc 2 for securing the disc 2 in place relative to the wheel 1 and for preventing the disc 2 from being disengaged from the barrel 4. The barrel 4 includes a key hole 42 communicating with the orifice 41 for receiving a key 48 which is also engaged with the bolt 80 such that the barrel 4 may be secured to the bolt 80 and rotated in concert with the bolt 80. Another key 45 is engaged in a recess 46 of the barrel 4 and is engaged in the plate 3 for securing the barrel 4 to the plate 3 and thus to the disc 2, such that the disc 2 and the plate 3 and the barrel 4 rotate in concert with the bolt 80. The wheel 1 is rotatably engaged on the barrel 4.

A spacer 5 includes a hole 51 for receiving the shaft 25 and for pivotally securing the spacer 5 to the disc 2. A spring 55 includes one end engaged in a hole 52 of the spacer 5 and includes the other end engaged in a hole 12 of the wheel 1. The spacer 5 includes one end 53 for engaging with the annular bulge 22 (FIGS. 3, 4) and includes a hand grip 54 formed on the other end. The one end 53 of the spacer 5 is biased, by the spring 55, to be engaged between the wheel 1 and the annular bulge 22 of the disc 2 (FIGS. 3, 4) for disengaging the teeth 14 of the wheel 1 from the teeth 31 of the plate 3.

When the hand grip 54 of the spacer 5 is depressed against the spring 55 for disengaging the one end 53 of the spacer 5 from the annular bulge 22 of the disc 2, the wheel 1 may be moved toward the disc 2 such that the teeth 14 of the wheel 1 may be moved to engage with the teeth 31 of the plate 3 and such that the bolt 80 may be rotated by the wheel 1 via the teeth 14, 31 and the plate 3 and the disc 2 and the barrel 4.

Accordingly, the hand wheel device in accordance with the present invention includes a clutch device for selectively coupling the hand wheel device to the motor driven bolt and for disengaging the hand wheel device from the motor driven bolt when the hand wheel device is not required to be used.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hand wheel device for securing to a motor driven bolt and for selectively actuating said motor driven bolt, said hand wheel device comprising:

a barrel for securing to said bolt, said barrel including a first and and a second end, a disc engaged on said first end of said barrel, a plate including a plurality of teeth and secured to said disc and secured to said first end of said barrel such that said barrel and said disc and said plate rotate in concert with each other, a wheel rotatably and slidably engaged on said second end of said barrel, said wheel including a plurality of teeth extended toward said plate for engaging with said teeth of said plate, means for biasing said teeth of said wheel away from said teeth of said plate, means for selectively spacing said teeth of said wheel away from said teeth of said plate, and said disc including an annular bulge extended toward said wheel, a spacer pivotally coupled to said disc at a shaft, and means for biasing said spacer to engage between said annular bulge of said disc and said wheel for spacing said teeth of said wheel away from said teeth of said plate, said wheel being allowed to be moved toward said disc for engaging said teeth of said wheel with said teeth of said plate when said spacer is disengaged from said annular bulge of said disc.

2. The hand wheel device according to claim 1, wherein said wheel includes a handle secured thereto for actuating said wheel.

3. The hand wheel device according to claim 1, wherein said shaft is disengaged from said annular bulge of said disc.

4. The hand wheel device according to claim 1, wherein said spacer includes a first end for engaging between said annular bulge of said disc and said wheel and for spacing said teeth of said wheel away from said teeth of said plate, said spacer includes a second end for depressing said spacer against said spacer biasing means and for disengaging said first end of said spacer from said annular bulge of said disc.

* * * * *